United States Patent
Shalikashvili et al.

(10) Patent No.: US 11,665,138 B2
(45) Date of Patent: May 30, 2023

(54) SYSTEM AND METHOD FOR AUTOMATIC WAF SERVICE CONFIGURATION

(71) Applicant: RADWARE, LTD., Tel Aviv (IL)

(72) Inventors: Vladimir Shalikashvili, Petah-Tiqwa (IL); Dekel Cohen, Neve Yarak (IL); Ayelet Shomer, Shoham (IL)

(73) Assignee: RADWARE LTD., Tel Aviv (IL)

( * ) Notice: Subject to any disclaimer, the term of this patent is extended or adjusted under 35 U.S.C. 154(b) by 46 days.

(21) Appl. No.: 16/729,860

(22) Filed: Dec. 30, 2019

(65) Prior Publication Data

US 2021/0203635 A1    Jul. 1, 2021

(51) Int. Cl.
*H04L 9/40*    (2022.01)
*H04L 9/32*    (2006.01)
*H04L 67/02*    (2022.01)

(52) U.S. Cl.
CPC ........ *H04L 63/0209* (2013.01); *H04L 9/3242* (2013.01); *H04L 9/3247* (2013.01); *H04L 63/0245* (2013.01); *H04L 63/0263* (2013.01); *H04L 63/0838* (2013.01); *H04L 63/0846* (2013.01); *H04L 63/101* (2013.01); *H04L 63/126* (2013.01); *H04L 63/20* (2013.01); *H04L 67/02* (2013.01)

(58) Field of Classification Search
CPC ............... H04L 63/0209; H04L 63/126; H04L 63/20; H04L 63/0245; H04L 63/0838; H04L 63/0263; H04L 63/0846; H04L 9/3247; H04L 9/3242; H04L 63/101; H04L 67/02; H04L 2463/121; H04L 63/0236; H04L 9/3228
See application file for complete search history.

(56) References Cited

U.S. PATENT DOCUMENTS

| | | | |
|---|---|---|---|
| 2002/0104015 A1* | 8/2002 | Barzilai | H04L 63/102 726/1 |
| 2008/0034212 A1* | 2/2008 | Altieri | H04L 9/3247 713/176 |
| 2018/0069896 A1* | 3/2018 | Urmanov | G06F 21/31 |
| 2018/0351949 A1* | 12/2018 | Scott | H04L 63/0853 |
| 2019/0014114 A1* | 1/2019 | Beddus | H04L 9/3273 |
| 2019/0215304 A1* | 7/2019 | Yang | G06F 21/629 |
| 2021/0036991 A1* | 2/2021 | Owens | H04L 63/126 |

* cited by examiner

*Primary Examiner* — Cheng-Feng Huang
(74) *Attorney, Agent, or Firm* — M&B IP Analysts, LLC

(57) ABSTRACT

A method and system for continuously configuring a web application firewall (WAF) are provided. The method includes receiving a request directed at a protected web application, wherein the request is received from a client device associated with a trusted user account, and wherein the protected web application is protected by the WAF; validating the received request based on at least a signature included in a header of the received request; when the received request is validated, generating an authorization rule based on the received request, wherein the authorization rule allows access to a resource of the protected web application designated in the received request, wherein the generated authorization rule is included in at least one whitelist the WAF is configured with; and configuring the WAF with the generated authorization rule to allow the received request and subsequent request to be directed to the resource of the protected web application.

21 Claims, 5 Drawing Sheets

SYSTEM AND METHOD FOR AUTOMATIC WAF SERVICE CONFIGURATION

TECHNICAL FIELD

The disclosure generally relates to web application firewalls (WAFs) and particularly to configuration of WAFs.

BACKGROUND

Web applications are advantageous for a number of reasons, among them that the application can be updated easily by the author(s) from a single point, it eliminates having multiple versions of software 'in the wild', and in general, provides the author with more control over their software. Web applications also provide users with the ability to use applications without requiring special software, libraries, plugins, and so on. Web applications, however, are vulnerable to web-based threats, and, as such, require security solutions.

To be protected, companies heavily invest in security solutions, such as anti-virus software and firewalls. However, as security solutions become more and more advanced, so do web attacks. Web attacks may be in form of viruses, worms, trojan horses, script-based attacks, system intrusions, and many others. Such attacks allow the attacker to control computers, access confidential information, and destroy valuable data.

One such solution is a web application firewall (WAF). A WAF is typically deployed in-line of traffic between clients and a server hosting a protected web-applications. A WAF filters, monitors, and blocks hypertext transfer protocol (HTTP) traffic to and from a web application. This is achieved by supplying the WAF with authorization rules or security policies to determine what traffic should be filtered, blocked, or let through. The security policies are configured based on known attack patterns or vulnerable application-paths. Such policies may be defined as blocklist (what should be blocked) or whitelist (what should be allowed)

One solution suggests manually configuring WAF polices. However, such an approach is inefficient as it requires advance knowledge of known attack patterns or paths. Configuring a WAF for controlling access to an application can be a time consuming and human-error-prone process. Furthermore, customers' requirements are not static and, indeed, fluctuate based, for example, on their development and business needs. This may lead to outdated, flawed and, therefore, even dangerous misconfigurations of the WAF. Additionally, some of the required values for configuration are not obvious and this fact complicates both onboarding and re-configuration of the WAF service. This complexity affects not only the time required for configuration, but the quality of such a configuration as well.

Furthermore, as web applications are dynamically changed by programmers, the system administrator often does not have full control over all these rapidly occurring changes, many of them being reported afterwards, if at all. Thus, the policy is statically enforced, and, thus, the web applications remain vulnerable.

Other solutions suggest crawling the web applications to learn the structure of an application and generate policies based on the crawling. As this solution is not a static solution, crawling cannot be rapidly adapted to capture changes in web applications. In today's computing environment, applications maybe changing every a few seconds (e.g., online retail sales).

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for continuously configuring a web application firewall (WAF). The method includes receiving a request directed at a protected web application, wherein the request is received from a client device associated with a trusted user, and wherein the protected web application is protected by the WAF; validating the received request based on at least a signature included in a header of the received request; when the received request is validated, generating an authorization rule based on the received request, wherein the authorization rule allows access to a resource of the protected web application designated in the received request, wherein the generated authorization rule is included in at least one whitelist the WAF is configured with; and configuring the WAF with the generated authorization rule to allow the received request and subsequent request to be directed to the resource of the protected web application.

Certain embodiments disclosed herein also include a system for continuously configuring a web application firewall (WAF). The system includes a processing circuitry; and a memory, the memory containing instructions that, when executed by the processing circuitry, configure the system to: receive a request directed at a protected web application, wherein the request is received from a client device associated with a trusted user account, and wherein the protected web application is protected by the WAF; validate the received request based on at least a signature included in a header of the received request; when the received request is validated, generate an authorization rule based on the received request, wherein the authorization rule allows access to a resource of the protected web application designated in the received request, wherein the generated authorization rule is included in at least one whitelist the WAF is configured with; and configure the WAF with the generated authorization rule to allow the received request and subsequent request to be directed to the resource of the protected web application.

BRIEF DESCRIPTION OF THE DRAWINGS

The subject matter of the disclosure is particularly pointed out and distinctly claimed in the claims at the conclusion of the specification. The foregoing and other objects, features and advantages will become apparent and more readily appreciated from the following detailed description taken in conjunction with the accompanying drawings, in which:

DETAILED DESCRIPTION

Figure 1:
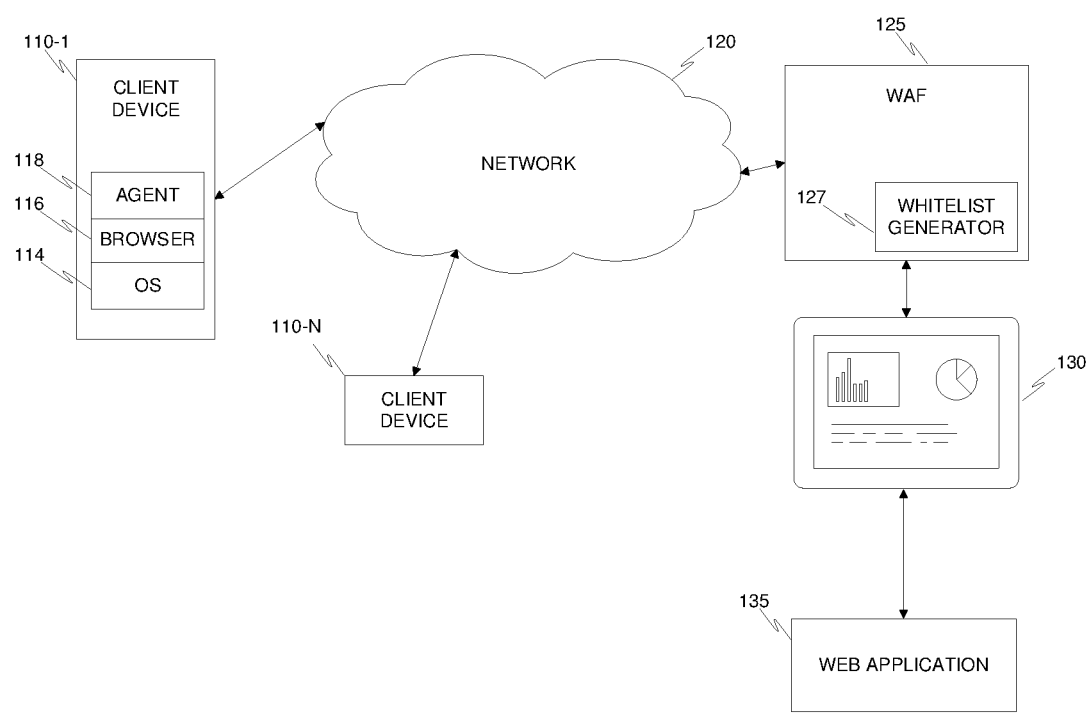
FIG. 1 is schematic illustration of a network diagram utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, a system and method for generating whitelists of resources that can be accessed. That is, in the whitelisting approach, every request is forbidden, barring those that are specifically authorized. In an embodiment, a whitelist defines a set rules to allow. According to an embodiment, each such rule is defined based on requests received from a group of trusted users. Therefore, a WAF can be adaptively configured as new web resources are added or existing resources are updated. Further, the configuration of the WAF based on newly created whitelists are performed automatically, without having a user or administrator manually configuring the WAF.

FIG. 1 is a schematic illustration of a network diagram 100 utilized to describe the various embodiments. A plurality of client devices 110-1 through 110-N (collectively referred to as client devices 110 or individually as client device 110), are communicatively connected to a network 120. Each client device 110 (as depicted in client device 110-1) includes a machine which supports the execution of an operating system (OS) 114. The OS 114 allows execution of higher-level applications, such as a web browser 116. The web browser 116 is operable for accessing, among others, web pages, and can, for example, generate and process HTTP requests directed at a web application.

A client device 110 may be a user device such as a PC, laptop, tablet, a smartphone, and the like, or, in another embodiment, a virtual machine, container, and the like. The client device 110 is used for accessing a server 130, over a network environment 120. In an embodiment, the client device 110 includes a monitoring agent 118 utilized as a part of a process for generating a whitelist for a WAF 125.

The monitoring agent 118 may be implemented, for example, as a plugin of the web browser. The monitoring agent 118 is configured to monitor requests (such as HTTP or HTTPS) generated by the respective client device 110. The monitoring agent 118 may then include a key from an authorization module (part of the monitoring agent 118, not shown).

In an embodiment, the WAF may require that a user of the client device register with the WAF by entering credentials, such as a username and password. The username may be associated with a user account which is flagged as a trusted user. In an embodiment a user account may be flagged as a trusted user for access to a first web application, and not flagged as a trusted user for a second web application.

The monitoring agent 118 may be realized in software, firmware, hardware, or any combination thereof. A software may be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

The server 130 is configured to host a protected web application 135. The server 130 may be a physical machine or a virtual machine. The server 130 may be deployed in a cloud-computing platform, a datacenter, or as an on-premise configuration.

The network environment 120 may be configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity.

The network environment 120 further provides connectivity for a web application firewall (WAF) 125, which is configured to control access to the protected web application 135. In an embodiment, the WAF 125 includes a WAF whitelist generator 127 configured to generate whitelists as will be discussed in detail below. In some embodiment, the WAF whitelist generator 127 may be realized as a stand-alone system, application, and/or service.

According to the disclosed embodiments, in order to provide update configuration of the WAF 125, a user (or a user account) of the client device 110 (e.g., client device 110-1) is designated by the WAF 125 as a trusted user. A trusted user account may be associated with a developer of the web application, a programmer testing the web application, or any user certified as being trusted. An account of a trusted user may include a login (i.e., a unique identifier) and password or other authorization mechanism to identify the holder of the user account. For the sake of simplicity, the client device 110-1 will be discussed hereinafter as being operated by a trusted user account.

The WAF whitelist generator 127 may configure the client device 110-1 to install the monitoring agent 118. For example, upon receiving a first request from the browser 116 to access the web application 135, a script is returned to the client device 110-1 to install the monitoring agent 118. The client device 110-1 may also be pre-installed with the agent 118. The monitoring agent 118 is required to be registered with the WAF whitelist generator 127 using a set of credentials. The registration is performed at set-up only once.

When the registration is completed, the monitoring agent 118 is configured to add a signature to any request directed to the web application 135. In an embodiment, the signature is a hash code added to a header of an HTTP or HTTPS request. The hash code may be a signature header that contains a keyed-hash message authentication code (HMAC), or any other type of hash authentication code. In example embodiment, the signature is generated using a time-based one-time password (TOTP) algorithm, such as standard RFC 6238. It should be noted that other keys, hash codes or methods of generating signatures may of course be utilized, and hash codes are given simply by way of example.

In an embodiment, the WAF whitelist generator 127 is configured to receive requests sent from a client device 110 of a trusted user account to access resources of the web application 135. In an embodiment, resources of the web application may include any one of: an image, a HTML page, an XML file, a script, a library, or any type of downable file or content. The WAF whitelist generator 127 is further configured to verify that the request is legitimate using a hash code (or other signature) included in the request.

To this end, first it is determined by the WAF whitelist generator 127, if a received request contains a signature, and then the identified signature is verified or otherwise validated. The verification may be performed using an algorithm utilized in generating the signature. For example, validation may be done by a TOTP algorithm.

When the signature in the request is verified, a rule is created to allow access to the resource (e.g., URL) designated in in the request. For example, if the request is to access a specific image in the web application 135, a rule designating the URL of such an image will be created and added to a whitelist configured with the WAF 125. That is, the WAF 125 is configured to allow access to a resource designated in the new rule.

In an embodiment, the newly created rule is checked against a list of rules stored by the WAF 125. If the request matches an existing rule, then no additional configuration (i.e., rule generation) of the WAF 125 is required. Otherwise, if the request does not match a rule, the WAF 125 (or a WAF whitelist generator 127) generates a new access rule based on the request.

In an embodiment, where a request is received matching at least one existing authorization rule, a timestamp of an authorization rule, included in the at least one whitelist, may be updated.

It should be appreciated that by generating access rules based on access requests from trusted users, the WAF 125 is constantly configured to resemble the real time security needs of the customer. Likewise, this process is already part of the trusted user's existing workflow, which decreases the time spent on configuring a WAF manually.

It should be noted that not all client devices accessing the web application are associated with a trusted user. In the example discussed in FIG. 1, a first client device 110-1 is associated with a trusted user account) and a second client device 110-N is associated with a user account which is not a trusted user. When a request is received from a client device 110-N, such a request will not cause any configuration of the WAF 125. Further, if such a request is not directed to a resource designated in a whitelist configured with the WAF 125, such a request would be blocked.

It should be further noted that the embodiments disclosed herein can be applied to a plurality of client devices 110 operated by trusted users. The client devices 110 may be located in different geographical locations. Likewise, the disclosed embodiments are applicable to configuration of multiple agents.

Figure 2:
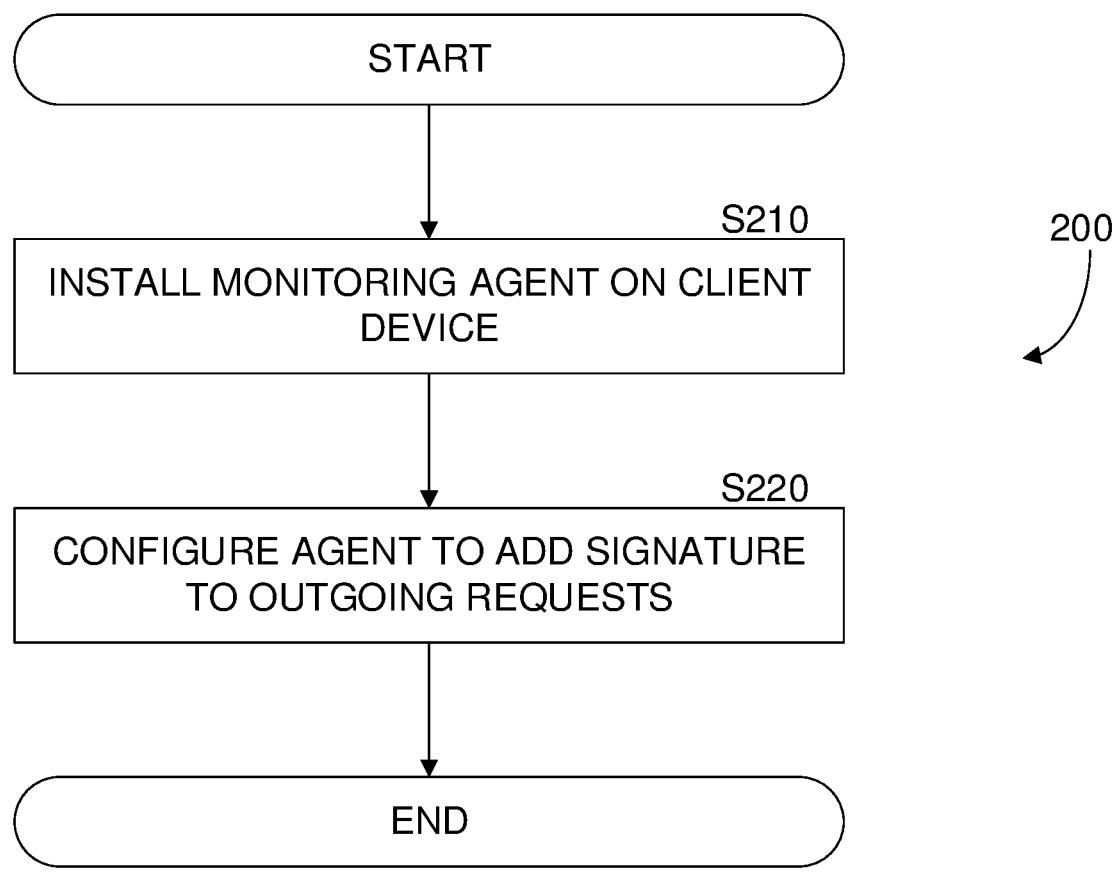
FIG. 2 is a flowchart of a method for enriching URI requests for configuring a WAF implemented according to an embodiment.

FIG. 2 is an example flowchart 200 of a method for configuring a client device to operate as a trusted client device according to an embodiment.

At S210, a monitoring agent is installed on a client device. The installation of the monitoring agent may be in response to a first-time request received at the WAF to access the protected web application.

The monitoring agent is operable for monitoring web traffic, and, in particular, requests generated by the client device to access a protected web application. The requests may include, for example, any application layer requests, such as, but not limited to, HTTP, HTTPS, and the like. The requests can be generated by any application (e.g., a web browser) installed on the client device that accesses a protected web application.

The monitoring agent is further configured to generate authentication keys for a WAF. In an embodiment the monitoring agent may be implemented as a browser plugin, such as agent 118 of FIG. 1. As mentioned above, in an embodiment, the WAF may require that a user of the client device register with the WAF by entering credentials, such as a username and password. The username may be associated with a user account which is flagged as a trusted user. In an embodiment a user account may be flagged as a trusted user for access to a first web application, and not flagged as a trusted user for a second web application.

At S220, a signature is added to a detected outgoing HTTP request directed to the protected wen application. To this end, a URL or URI, identifying the address of a resource, is designated in the request is identified. When the identified URL/URI is directed to the protected web application (or any of its resources), the signature is added to the request header. In an embodiment, the signature may include a hash-based message authentication code (HMAC). In some embodiments, the signature is added to any outgoing request. In an embodiment, this step is performed by a client device operated by a trusted user account and installed by the monitoring agent.

In an embodiment, at S220, an action may be associated with a specified resource address. The specified resource may be a URL or a URI, among others. The action may include allow full access or allow access with some conditions.

Figure 3:
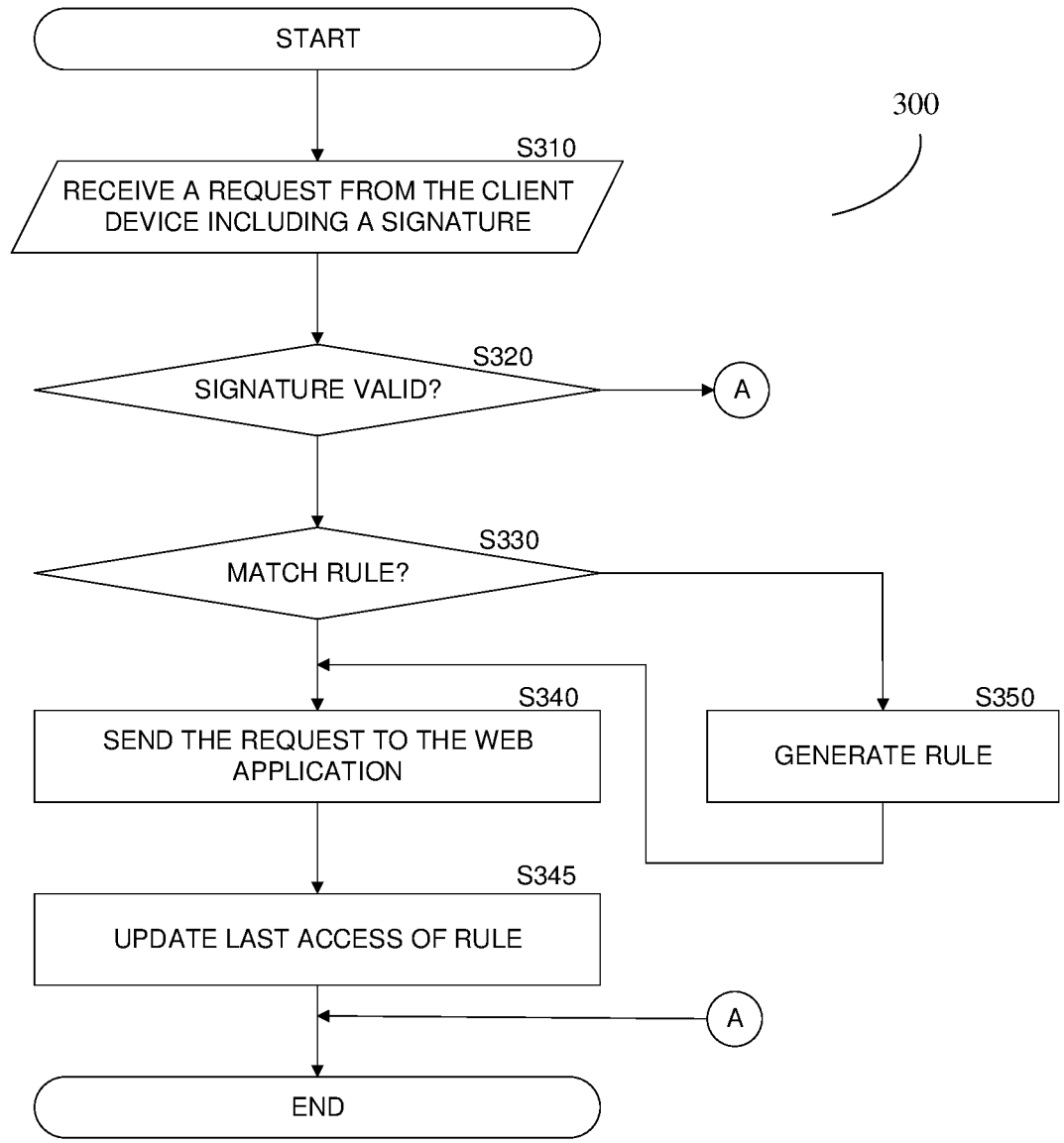
FIG. 3 is a flowchart of a method for whitelist rule generation based on enriched URI requests implemented according to an embodiment.

FIG. 3 is an example flowchart 300 of a method for whitelist rule generation based on enriched URI requests according to an embodiment.

At S310 an HTTP request directed at a web application, including an enriched HTTP header, is received and a signature is extracted from the header. Extracting the signature may involve reading the header and parsing a portion of it.

At S320, the extracted signature is validated. In an example embodiment, the validation may be performed using a TOTP algorithm (the RFC 6238 standard). It should be readily understood that other authentication algorithms may be used without departing from the scope of this disclosure. When the extracted signature is validated, execution continues at S330, otherwise, execution ends and the request is denied.

At S330, the validated request is checked against a list of stored authorization rules. If the request matches one or more rules, execution continues at S340. If the request does not match a rule, then execution continues at S350.

At S340 the request is sent to the web application to which it is directed. In an embodiment a WAF may extract the signature from the header of the HTTP request prior to sending it to the designated web application.

At optional S345, the list of the authorization rules may be updated to indicate that the rule was last accessed based on a timestamp at which the request was received. In some embodiments, rules may be culled periodically, occasionally, or otherwise, such that rules which have not been used within a predefined period of time are deleted from the whitelist.

At S350, a rule is generated based on the request. For example, if the request includes access to a specific file (such as an image file), a rule is generated which would allow users who are in the same network group as the trusted user, and are attempting to access the web application through the WAF to access the file, to send the request to the web application to access the file. The generated rule may include a timestamp of when the rule was generated.

Figure 4:
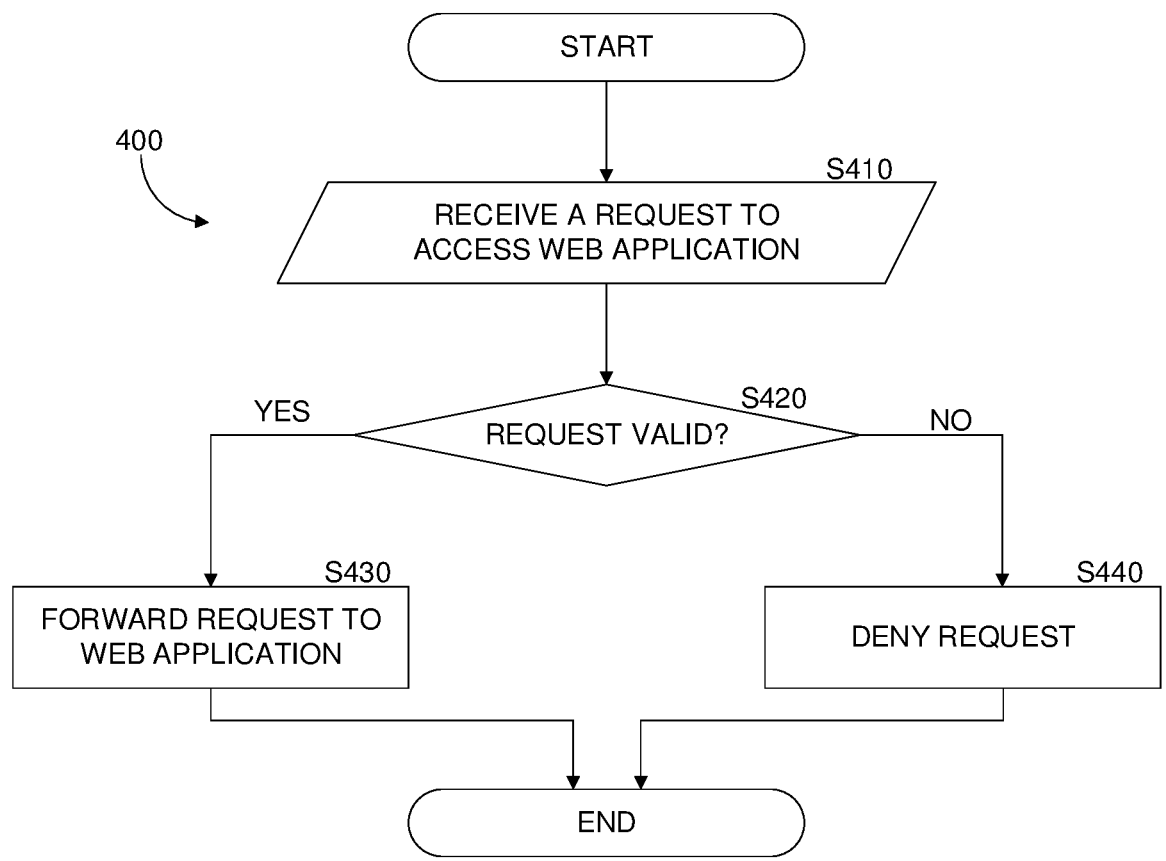
FIG. 4 is a flowchart for updating rule usage in a WAF according to an embodiment.

FIG. 4 is an example flowchart 400 for updating rule usage in a WAF, implemented in accordance with an embodiment.

At 410, a request is received from a client device to access a web application. In this example, the request is an HTTP request generated by a browser of the client device.

At S420, the request is checked against a list of authorization rules. In an embodiment a further check may be performed to determine if the received request was received from a client device authorized to access the web application. Checking authorization may include determining if a user account associated with the client device is authorized to access the web application.

If the request is valid (i.e., complies with a whitelist rule), execution continues at S430. If the request is invalid execution may continue at S440. A valid request is a request which matches with one or more authorization rules. An invalid request is a request which the user has not been specifically allowed to make. This approach is also known as whitelisting, i.e. every request is forbidden, barring those that are specifically authorized. This is opposed to blacklisting, which states that all requests are valid, barring those which are specifically stated as not.

At S430 the request is forwarded to the web application, in response to determining that the request was a valid request, based on matching with one or more rules.

At S440 the request is denied, resulting in blocking it from arriving at the web application. In some embodiments, the denied request may be sent to one or more trusted users. If the trusted user decides that the request should be authorized, the trusted user may perform the steps resulting in generation of a new authorization rule, such as is described in more detail above. In certain embodiments, the WAF may send the client device a notice of denial.

The methods discussed with reference to FIGS. 3 and 4 can be performed by the WAF whitelist generator 127.

Figure 5:
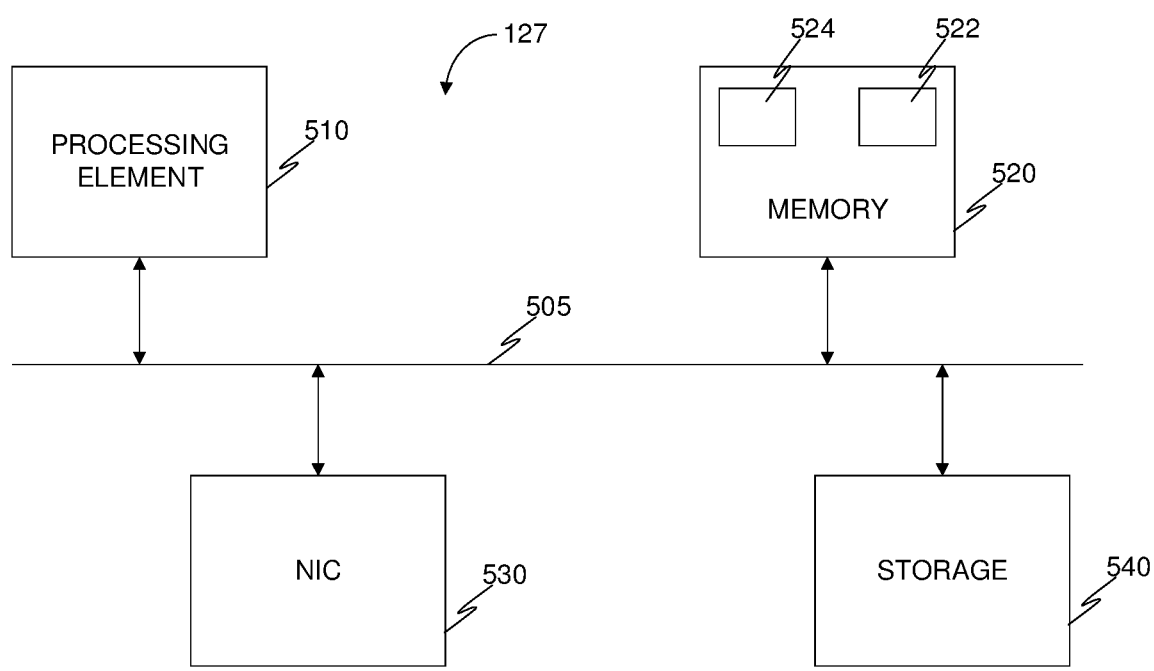
FIG. 5 is a schematic illustration of a whitelist generator implemented according to an embodiment.

FIG. 5 is an example block diagram of the WAF whitelist generator 127, implemented according to an embodiment. The WAF whitelist generator 127 includes at least one processing element 510, for example, a central processing unit (CPU). In an embodiment, the processing element 510 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing element 510 is coupled via a bus 505 to a memory 520.

The memory 520 may include a memory portion 522 that contains instructions that when executed by the processing element 510 performs the method described in more detail herein. The memory 520 may be further used as a working scratch pad for the processing element 510, a temporary storage, and others, as the case may be. The memory 520 may be a volatile memory such as, but not limited to, random access memory (RAM), or non-volatile memory (NVM), such as, but not limited to, flash memory. Memory 520 may further include memory portions 524 containing received events. The processing element 510 may be coupled to a network interface controller (NIC) 530.

The processing element 510 may be further coupled with a storage 540. Storage 540 may be used for the purpose of holding a copy of the method executed in accordance with the disclosed technique. Storage 540 may be implemented as a distributed storage system to which the WAF server 140 is communicatively coupled via the NIC 530.

The processing element 510 and/or the memory 520 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for continuously configuring a web application firewall (WAF), comprising:
   receiving, by the WAF, a request directed at a protected web application, wherein the request is received from a client device associated with a trusted user account, and wherein the protected web application is protected by the WAF;
   validating, by the WAF, the received request based on at least a signature included in a header of the received request, wherein the at least one signature indicates that the client device from which the request was received corresponds to the trusted user account;
   when the received request is validated, generating an authorization rule based on the received request, wherein the authorization rule allows access to a resource of the protected web application designated in the received request, wherein the generated authorization rule is included in at least one whitelist the WAF is configured with; and
   configuring the WAF with the generated authorization rule to allow the received request and subsequent request to be directed to the resource of the protected web application;
   wherein the receiving, validating, generating when the received request is validated, and configuring are repeated for requests subsequent to the request so as to continuously configure the WAF.

2. The method of claim 1, wherein generating the authorization rule further comprises:
   matching the received request against authorization rules included in the at least one whitelist; and
   generating the authorization rule based on the received request, in response to unsuccessfully matching the request to the authorization rules included in the at least one whitelist, wherein each generated authorization rule is associated with a creation timestamp.

3. The method of claim 2, further comprising:
   updating a timestamp of an authorization rule included in the at least one whitelist in response to the received request matching at least one existing authorization rule.

4. The method of claim 3, further comprising:
   periodically culling authorization rules, wherein the timestamp of an authorization rule indicates that a period of time exceeding a threshold has lapsed.

5. The method of claim 1, wherein the signature is a hash message authentication code (HMAC), generated by the client device using an authentication process.

6. The method of claim 5, wherein validating the received request further comprises:
   extracting the signature from the header from the received request; and
   verifying the extracted signature using the authentication process, wherein the authentication process is a time-based one-time password (TOTP).

7. The method of claim 1, wherein the trusted user account is registered and authenticated by the WAF.

8. The method of claim 1, wherein the signature is added by a monitoring agent installed on the client device as a plugin of a web browser.

9. The method of claim 1, wherein generating the authorization rule further comprises:
   identifying an address of a resource of the protected web application, wherein the address is at least a uniform resource identifier (URI); and
   associating an action with the identified address.

10. The method of claim 1, wherein the resource of the protected web application includes any one of: an image, a HTML page, an XML file, a script, a downloadable file, and a library.

11. A non-transitory computer readable medium having stored thereon instructions for causing a processing circuitry to execute a process for continuously configuring a web application firewall (WAF), the process comprising:
    receiving, by the WAF, a request directed at a protected web application, wherein the request is received from a client device associated with a trusted user account, and wherein the protected web application is protected by the WAF;
    validating, by the WAF, the received request based on at least a signature included in a header of the received request, wherein the at least one signature indicates that the client device from which the request was received corresponds to the trusted user account;
    when the received request is validated, generating an authorization rule based on the received request, wherein the authorization rule allows access to a resource of the protected web application designated in the received request, wherein the generated authorization rule is included in at least one whitelist the WAF is configured with; and
    configuring the WAF with the generated authorization rule to allow the received request and subsequent request to be directed to the resource of the protected web application;
    wherein the receiving, validating, generating when the received request is validated, and configuring are repeated for requests subsequent to the request so as to continuously configure the WAF.

12. A system for continuously configuring a web application firewall (WAF), comprising:
    a processing circuitry; and
    a memory, the memory containing instructions that, when executed by the processing circuitry, configure the system to:
    receive, by the system, a request directed at a protected web application, wherein the request is received from a client device associated with a trusted user account, and wherein the protected web application is protected by the WAF;
    validate, by the system, the received request based on at least a signature included in a header of the received request, wherein the at least one signature indicates that the client device from which the request was received corresponds to the trusted user account;
    when the received request is validated, generate an authorization rule based on the received request, wherein the authorization rule allows access to a resource of the protected web application designated in the received request, wherein the generated authorization rule is included in at least one whitelist the WAF is configured with; and set the WAF with the generated authorization rule to allow the received request and subsequent request to be directed to the resource of the protected web application;

wherein the receiving, validating, generating when the received request is validated, and configuring are repeated for requests subsequent to the request so as to continuously configure the WAF.

13. The system of claim 12, wherein the system is further configured to:
    match the received request against authorization rules included in the at least one whitelist; and
    generate the authorization rule based on the received request, in response to unsuccessfully matching the request to the authorization rules included in the at least one whitelist, wherein each generated authorization rule is associated with a creation timestamp.

14. The system of claim 13, wherein the system is further configured to:
    update a timestamp of an authorization rule included in the at least one whitelist in response to the received request matching at least one existing authorization rule.

15. The system of claim 14, wherein the system is further configured to:
    periodically cull authorization rules, wherein the timestamp of an authorization rule indicates that a period of time exceeding a threshold has lapsed.

16. The system of claim 12, wherein the signature is a hash message authentication code (HMAC), generated by the client device using an authentication process.

17. The system of claim 16, wherein the system is further configured to:
    extract the signature from the header from the received request; and
    verify the extracted signature using authentication TOTP process, wherein the authentication process is a time-based one-time password (TOTP).

18. The system of claim 12, wherein the trusted user account is registered and authenticated by the WAF.

19. The system of claim 12, wherein the signature is added by a monitoring agent installed on the client device as a plugin of a web browser.

20. The system of claim 12, wherein the system is further configured to:
    identify an address of a resource of the protected web application, wherein the address is at least a uniform resource identifier (URI); and
    associate an action with the identified address.

21. The system of claim 12, wherein the resource of the protected web application includes any one of: an image, a HTML page, an XML file, a script, a downloadable file, and a library.

* * * * *